United States Patent [19]

Rademachers et al.

[11] Patent Number: 4,957,562

[45] Date of Patent: Sep. 18, 1990

[54] CHROME OXIDE GREEN, A PROCESS FOR ITS PREPARATION AND ITS USE

[75] Inventors: Jakob Rademachers; Dieter Räde; Hans-Ulrich Höfs; Günther Teichmann; Gerhard Trenczek, all of Krefeld, Fed. Rep. of Germany

[73] Assignee: Bayer Aktiengesellschaft, Leverkusen-Bayerwerk, Fed. Rep. of Germany

[21] Appl. No.: 259,597

[22] Filed: Oct. 19, 1988

[30] Foreign Application Priority Data

Oct. 31, 1987 [DE] Fed. Rep. of Germany ....... 3736994

[51] Int. Cl.$^5$ .............................................. C09C 1/34
[52] U.S. Cl. .................................................. 106/453
[58] Field of Search ........................................ 106/453

[56] References Cited

U.S. PATENT DOCUMENTS 4,040,860 8/1977 Mansmann .......................... 106/453
4,067,747 1/1978 Mansmann .......................... 106/453

FOREIGN PATENT DOCUMENTS 928170 6/1963 United Kingdom .

Primary Examiner—Peter D. Rosenberg
Attorney, Agent, or Firm—Connolly and Hutz

[57] ABSTRACT

Chrome green oxide useful, inter alia, as a coloring material and having a water number of 10 to 40 g/100 g is prepared by adding sulphonic acid compounds, polyphosphoric acid compounds, polyacrylic acid compounds or mixtures thereof, in quantities of from 0.1 to 2% by weight, to an aqueous suspension of chrome oxide green pigment having a BET surface area of from 1 to 20 m$^2$/g before drying, and then drying the suspension.

14 Claims, No Drawings

CHROME OXIDE GREEN, A PROCESS FOR ITS PREPARATION AND ITS USE

This invention relates to improved chrome oxide green, to a process for its preparation and to its use.

BACKGROUND OF THE INVENTION

Chrome oxide green is an important inorganic pigment. The oxide of trivalent chromium which crystallizes in the corundum latice has long been known. It is a pigment with high coloring and covering power which is thermally and mechanically stale up to high temperatures and inert towards most chemicals. Because of its deep green color, it takes up an important place among inorganic pigments.

Due to its chemical resistance, chrome oxide green also serves as starting material for the preparation of fire resistant materials used inter alia for lining melting furnaces or vats, e.g. for the manufacture of glass. Chrome oxide green is also used for surface finishing by the flame and plasma spraying process because of its great hardness. The trivalent oxide also serves as starting material for chromium carbide and metallic chromium.

Chrome oxide pigments are mainly obtained by the reduction of alkali metal chromates, starting with solid salts or aqueous solutions. The reducing agents used are elementary sulphur or compounds containing sulphur or carbon or compounds containing carbon. The reaction is carried out at normal pressure or at elevated pressure up to temperatures of about 1000° C. After the solid reaction products have cooled, the formed soluble salts and the chromium (III) oxide are separated by mashing with water, filtration and washing. The filter cake is then dried and ground. The particle size and therefore color shade vary mainly in dependence upon the temperature (Ullmanns Encyklopädie der technischen Chemie, 4th Edition, volume 18, page 605, 1979). When the primary particle diameter is relatively small, the color is a relatively light green with a yellow tinge whereas larger particle sizes result in darker green pigments with a blue tinge.

One disadvantage of the chrome oxide greens available on the market is that they require a very large quantity of water for mashing. This is liable to impair the strength of the colored products, for example when the pigments are used for coloring concrete, and when such a chrome oxide green is used in the manufacture of refractory products, the products show an undesirable formation of pores and excessive shrinkage when fired. These chrome oxide greens also tend to persistent tackiness and formation of lumps and therefore frequently give rise to difficulties in dosing and mixing processes.

It is an object of the present invention to provide an improved chrome oxide green which does not have the disadvantages described above.

BRIEF DESCRIPTION OF THE INVENTION

It has now been found that these requirements can be fulfilled to an excellent degree by means of a chrome oxide green which has a water number in the range of 10 to 40 g/100 g. This chrome oxide green is the subject of the present invention.

DETAILED DESCRIPTION

The water number is an indication of the water requirement of the pigment. It is determined by the same method as that employed for the oil number according to DIN 53 199 of Aug. 1965 but using distilled or deionised water instead of linseed oil. The apparatus employed are the same as those for determining the oil number.

In another method which has also proved to be very satisfactory, water is added to a quantity of pigment in a glass beaker and mixed with the pigment until a fluid paste is obtained. A description of this method is given in the Code of Practice "Bayer-Pigmente No. 2.1.7, Order No. AC 14 847 of 01.05.1973":

"10 g of pigment are accurately weighted to the nearest ± 0.1 g and introduced into a glass beaker. Distilled water is added dropwise while the mixture is stirred and kneaded with a plastic rod. The end point is reached when the aqueous suspension of the pigment flows freely. The water number depends on the force expended in incorporating the water in the pigment. Accurate recognition of the end point requires a certain amount of practise. Since the water number is given in g of water/100 g of pigment, this is calculated as water number = ml of water $\times$ 10". The water numbers given below are based on this method.

Commercially available chrome oxide pigments have high water numbers, far above 50 g/100 g.

In a preferred embodiment, the chrome oxide green according to the invention is in the form of spherical agglomerates with a diameter of from 0.01 to 1 mm.

This chrome oxide green is distinguished by its excellent fluidity, the ease with which it can be dosed and its low tendency to form dust.

The BET surface area of the chrome oxide green according to the invention is preferably in the range of from 1 to 20 $m^2/g$, in particular from 2 to 10 $m^2/g$. (BET measuring method according to DIN 66 131, section 6, Oct. 1973: 5 point method, measuring gas: nitrogen, adsorption at the temperature of boiling nitrogen, surface area required for a molecule of nitrogen assumed to be 0.162 $nm^2$; preliminary treatment: one hour's heating in a stream of nitrogen at 130° C.). When chrome oxides with distinctly higher BET surface areas are used in the process according to the invention, e.g. of the kind which may be obtained by annealing chromium hydroxides obtained from chromate solutions by reduction, the pigments obtained do not clump together but they have a greater water requirement.

The chrome oxide green according to the invention contains from 0.1 to 2% by weight, preferably from 0.2 to 1% by weight of substances containing carbon and/or phosphorous. The carbon-containing substances are preferably salts of polyacrylic acids and sulphonic acids, preferably the alkali metal and/or ammonium salts.

Particularly suitable phosphorous-containing substances are polyphosphates, preferably alkali metal or ammonium polyphosphate.

This invention also relates to a process for the preparation of the chrome oxide green according to the invention. This process is characterised in that before the final stage of drying, compounds of sulphonic acid, of polyphosphoric acid and/or of polyacrylic acid are added in quantities of from 0.1 to 2% by weight, preferably from 0.2 to 1% by weight to an aqueous suspension of a chrome oxide green having a BET surface of from 1 to 20 $m^2/g$.

It has been found that the ammonium compounds and/or alkali metal compounds are particularly advantageous.

Exceptionally good results are obtained when the aqueous suspension has a chrome oxide content of from 50 to 80% by weight.

Drying may be carried out by any method which does not destroy the effect of the added compounds, e.g. due to overheating. For example, drying may be carried out by atomizing a 50 to 80% by weight chrome oxide green suspension in a heating chamber at a temperature above 100° C. with the addition of one or more of the above mentioned compounds.

Exceptionally good results are obtained when the final stage of drying is carried out as atomization or spray drying.

The proportion of additives in the chrome oxide suspension transferred to the drying stage should be from 0.1 to 2.0% by weight, preferably from 0.2 to 1.0% by weight, based on the chrome oxide green. The desired water number is not obtained if the additive content is lower whereas higher additive contents not only reduce the chrome oxide content in the finished powder, which is in most cases undesirable, but tend to give rise to the formation of deposits of relatively firmly adhering chrome oxide crusts in the atomization drier.

The chrome oxides obtained by the process according to the invention have substantially reduced water numbers of from 10 to 40 g/100 g, depending on the starting material and the nature and concentration of the added compound(s).

When atomization or spray driers are employed, the process according to the invention also gives rise to deagglomerates which are obtained in a spherical form with a narrow range of sizes. The diameters of the spherical particles lie within the range of 0.01 to 1.0 mm, depending on the crystallite size of the chrome oxide green, the concentration of the suspension, the quantity of one or more of the above mentioned compounds added and the nature of the atomizer and possibly of its nozzle opening. Much finer agglomerates again have an increase tendency to stick and form lumps while coarser agglomerates give rise to technical difficulties in their preparation. The nozzle openings should have diameters of from 3 to 15 mm, depending on the capacity of the drier.

The process for the preparation of the improved chrome oxide green according to the invention may be carried out in any suitable drier but atomization driers are particularly advantageous, including both conventional nozzle driers with one-material or two-material nozzles and driers with atomization discs since a very easily pourable dry material can be obtained from these driers due to the action of the above mentioned additives. Drying may also be carried out by atomization in reaction cyclones or in fluidized bed driers or in a combination of atomization and fluidized bed driers.

The excellent free flowing character of the chrome oxide green powders prepared according to the invention by spray drying, combined with the minimal tendency of these powders to form dust, is an advantage, particularly for virtually complete and rapid filling and unloading of transport and stacking containers, in particular for silos, and for dosing and mixing with other substances as well as for flame and plasma spraying. Conventional chrome oxide green pigments have a strong tendency to cake together and stick, which gives rise to problems when emptying storage and transport containers and when dosing and mixing the pigments with other substances, due to granulation and the formation of cake deposits.

The outflow of finely divided powders from funnels is a measure of their capacity to flow. If the powders are free flowing, the outflow time may be used as a direct measure of the flowing and trickling capacity. If the powder can only be made to flow through the funnel intermittently and only with the aid of tapping the funnel, then the flow can be assessed qualitatively. In that case, the size of the funnel used and its outflow opening must be considered in relation to the dimensions used in technical production processes.

Chrome oxide green which has already been dried and ground may be mashed again for the purpose of adding one or more of the above mentioned additive compounds.

Another advantage of the process according to the invention is that the usual grinding process after drying may be omitted so that there are no additional costs in the overall manufacturing process.

This invention also relates to the use of the chrome oxide green according to the invention for the preparation of metallic chromium, chromium carbide and refractory materials or for colouring substrates.

The process will now be explained in more detail with the aid of the following examples which, however, do not limit the process.

In the examples given, the method of determining the outflow time with a DIN cup 4 (DIN 53 211 of Apr. 1974) was applied analogously to the powders to be tested. The results are given in DIN seconds. For better differentiation, the outflow times were in addition determined by means of a outflow funnel with a 6 mm nozzle, here characterized as cup 6, which corresponded entirely to a DIN cup 4. The results are given in seconds. The measured values are listed in Tables 1 and 2. The chrome oxide green powders according to the invention which have been dried by atomization drying are characterized in that they flow freely out of cup 6 without the aid of tapping the cup.

EXAMPLE 1

133 kg of filter cake having a solids content of 75% by weight, annealed and washed raw material for chrome oxide green GX (trade product of Bayer AG) are stirred up with 34 kg of completely desalted water and 0.75 kg of a Polystabil AMV solution, corresponding to 0.3 kg of ammonium polyacrylate (trade product of Chemische Fabrik Stockhausen GmbH) until a homogeneous suspension is obtained. This suspension is dried in a spray drier with atomization disc which has a diameter of 120 mm and is equipped with 8 nozzles having a diameter of 7 mm. The atomizer disc is rotated at 16,400 min$^{-1}$ and drying is carried out in a stream of hot burner exhaust gases passing through in unidirectional flow at an inlet temperature of 480° C. and an outlet temperature of 135° C.

The properties of this product and of the products obtained in the examples given below are shown in Table 1.

EXAMPLE 2

400 g of the filter cake from Example 1 are stirred up with 100 g of completely desalted water and 2.25 g of Polystabil AMV solution, corresponding to 0.9 g ammonium polyacrylate. (trade product of Chemische Fabrik Stockhausen GmbH) until a homogeneous suspension is obtained. This suspension is dried in a drying cupboard at 105° to 100° C. and then coarsely crushed and rubbed through a sieve with a mesh of 0.4 mm.

EXAMPLE 3

160 kg of filter cake containing 60.5% by weight of annealed and washed $Cr_2O_3$ raw material for experimental product PK 5304 (trade product of Bayer AG) are stirred up with 0.75 kg of Dispex N 40 solution, corresponding to 0.3 kg of sodium polyacrylate (trade product of Allied Colloids Manufacturing GmbH) until a homogeneous suspension is obtained. This suspension is dried as in Example 1. The product has a BET surface area of 6.9 $m^2/g$.

EXAMPLE 4

500 g of the filter cake from Example 3 are stirred up with 2.25 g of Dispex N 40 solution, corresponding to 0.9 g of sodium polyacrylate (trade product of Allied Colloids Manufacturing GmbH) until a homogeneous suspension is obtained. This suspension is worked up as in Example 2.

EXAMPLE 5

67 kg of filter cake having a solids content of 75% by weight of annealed and washed raw material for chrome oxide green GN (trade product of Bayer AG) are stirred up with 16 kg of completely desalted water, 0.215 kg of sodium lignin sulphonate type 220 Zewa EF powder and 0.285 kg of sodium lignin sulphonate type 210 Zewa S powder, both products of Lignin-Chemie Waldhof-Holmen GmbH, until a homogeneous suspension is obtained. This suspension is dried as in Example 1 at an inlet temperature of 470° C. and an outlet temperature of 140° C.

EXAMPLE 6

400 g of the filter cake from Example 5 are stirred up with 100 g of completely desalted water, 1.29 g of sodium lignin sulphonate type 220 Zewa EF powder and 1.71 g of sodium lignin sulphonate type 210 Zewa S powder, both products of Lignin-Chemie Waldhof-Holmen GmbH, until a homogeneous suspension is obtained. This suspension is worked up as in Example 2.

EXAMPLE 7

100 kg of experimental product PK 5304 (trade product of Bayer AG) are stirred up homogeneously with 67 kg of completely desalted water and 0.30 kg of sodium hexametaphosphate. The resulting suspension is worked up as in Example 1.

EXAMPLE 8

300 g of experimental product PK 5304 (trade product of Bayer AG) are homogeneously stirred up with 20 g of completely desalted water and 0.90 g of sodium hexametaphosphate. The resulting suspension is worked up as in Example 2.

EXAMPLE 9

100 kg of experimental product PK 5304 (trade product of Bayer AG) are homogeneously stirred up with 68 kg of completely desalted water, 0.25 kg of Dispex N 40 solution (trade product of Allied Colloids Manufacturing GmbH) and 0.60 kg of Polysalz F (sodium polyacrylate) (trade product of BASF AG). The resulting suspension is worked up as in Example 1.

EXAMPLE 10

300 g of experimental product PK 5304 (trade product of Bayer AG) are homogeneously stirred up with 200 g of completely desalted water, 0.75 g of Dispex N 40 solution (trade product of Allied Colloids Manufacturing GmbH) and 1.80 g of Polysalz F (trade product of BASF AG). The resulting suspension is worked up as in Example 2.

EXAMPLE 11

100 kg of chrome oxide green GN having a BET surface area of 3.9 $m^2/g$ (trade product of Bayer AG) are homogeneously stirred up with 67 kg of completely desalted water and 0.75 kg of Polystabil S 312 solution, corresponding to 0.3 kg of sodium polyacrylate (trade product of Chemische Fabrik Stockhausen GmbH). The resulting suspension is worked up as in Example 1.

EXAMPLE 12

300 g of chrome oxide green GN (trade product of Bayer AG) are homogeneously stirred up with 200 g of completely desalted water and 2.25 g of Polystabil S 312 solution (trade product of Chemische Fabrik Stockhausen GmbH). The resulting suspension is worked up as in Example 2.

EXAMPLE 13

100 kg of chrome oxide green GX having a BET surface area of 3.2 $m^2/g$ (trade product of Bayer AG) are homogeneously stirred up with 67 kg of completely desalted water and 0.75 kg of Polystabil S 312 solution (trade product of Chemische Fabrik Stockhausen GmbH). The resulting suspension is worked up as in Example 1. The product obtained has a BET surface are of 3.0 $m^2/g$.

EXAMPLE 14

300 g of chrome oxide green GX (trade product of Bayer AG) are homogeneously stirred up with 200 g of completely desalted water and 2.25 g of Polystabil S 312 solution (trade product of Chemische Fabrik Stockhausen GmbH). The suspension obtained is worked up as in Example 2.

COMPARISON EXAMPLE A 133 kg of filter cake having a solids content of 75% by weight of annealed and washed raw material for chrome oxide green GN (trade product of Bayer AG) are homogeneously stirred up with 180 kg of completely desalted water. The resulting suspension is worked up as in Example 1.

The properties of this product and those of the products obtained in the following comparison examples are shown in Table 2.

COMPARISON EXAMPLE B 400 g of the filter cake from Comparison Example A are homogeneously stirred up with 537 g of completely desalted water. The suspension obtained is worked up as in Example 2.

COMPARISON EXAMPLE C 100 kg of chrome oxide green GN (trade product of Bayer AG) are homogeneously stirred up with 138 kg of completely desalted water. The resulting suspension is worked up as in Example 1.

COMPARISON EXAMPLE D 500 g of chrome oxide green GN (trade product of Bayer AG) are homogeneously stirred up with 690 g of completely desalted water. The resulting suspension is worked up as in Example 2.

COMPARISON EXAMPLE E 300 g of chrome oxide green GX (trade product of Bayer AG) are homogeneously stirred up with 200 g of completely desalted water. The resulting suspension is worked up as in Example 2.

TABLE 1

| Example | Water Number (g/100 g) | Outflow Time DIN cup 4 (DIN 53 211) (DIN Seconds) | Outflow Time Cup 6 (analogous to DIN 53 211) (Seconds) |
|---|---|---|---|
| 1 | 31 | 110 without tapping | 40 |
| 2 | 19 | Does not flow out | Does not flow out |
| 3 | 21 | 150 without tapping | 35 |
| 4 | 20 | Does not flow out | Does not flow out |
| 5 | 31 | 51 without tapping | 21 |
| 6 | 15 | Does not flow out | Does not flow out |
| 7 | 24 | >180 with tapping | 35 |
| 8 | 22 | Does not flow out | Does not flow out |
| 9 | 21 | 60 without tapping | 30 |
| 10 | 23 | Does not flow out | Does not flow out |
| 11 | 17 | 75 without tapping | 24 |
| 12 | 26 | Does not flow out | Does not flow out |
| 13 | 16 | >240 with tapping | 30 |
| 14 | 16 | Does not flow out | Does not flow out |

TABLE 2

| Comparison Example | Water Number (g/100 g) | Outflow Time DIN cup 4 (DIN 53 211) (DIN Seconds) | Outflow Time Cup 6 (analogous to DIN 53 211) (Seconds) |
|---|---|---|---|
| A | 66 | Does not flow out | Does not flow out |
| B | 73 | Does not flow out | Does not flow out |
| C | 121 | Does not flow out | Does not flow out |
| D | 120 | Does not flow out | Does not flow out |
| E | 120 | Does not flow out | Does not flow out |

What is claimed is:

1. Chrome oxide green pigment composition having a water number in the range of from 10 to 40 g/100 g.

2. Chrome oxide green pigment composition according to claim 1 in the form of spherical agglomerates having a diameter of 0.01 to 1 mm.

3. Chrome oxide green pigment composition according to claim 1 wherein the BET surface area is from 1 to 20 m$^2$/g.

4. Chrome oxide green pigment composition according to claim 1 wherein the BET surface area is from 2 to 10 m$^2$/g.

5. Chrome oxide green pigment composition according to claim 1 which contains from 0.1 to 2% by weight of carbon or phosphorous containing substances.

6. Chrome oxide green pigment composition according to claim 5 which contains from 0.2 to 1% by weight of carbon or phosphorous containing substances.

7. Chrome oxide green pigment composition according to claim 5 which contains carbon-containing substances which are salts of polyacrylic acids or sulphonic acids.

8. Chrome oxide green pigment composition according to claim 5 which contains carbon-containing substances which are alkali metal or ammonium salts of polyacrylic acids or sulphonic acids.

9. Chrome oxide green pigment composition according to claim 5 which contains phosphorus-containing substances which are polyphosphates.

10. Chrome oxide green pigment composition according to claim 5 which contains phosphorus-containing substances which are alkali metal or ammonium polyphosphates.

11. Process for the preparation of chrome oxide green pigment composition having a water number of from 10 to 40 g/100 g which comprises adding sulphonic acid compounds, polyphosphoric acid compounds, polyacrylic acid compounds or mixtures thereof, in quantities of from 0.1 to 2% by weight, to an aqueous suspension of chrome oxide green having a BET surface area of from 1 to 20 m$^2$/g before drying, then drying the suspension.

12. Process according to claim 11 wherein the amount of acid compounds is from 0.2 to 1% by weight.

13. Process according to claim 11 wherein the aqueous suspension contains from 50 to 80% by weight of chrome oxide green pigment.

14. Process according to claim 11 wherein the drying is by atomization drying.

* * * * *